3,502,618
ADHESIVE PRODUCTS COMPRISING AN EPOXY RESIN, AN AZIRIDINYL COMPOUND AND A CATALYTIC AMOUNT OF A COMPOUND CON-

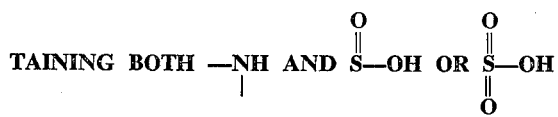

GROUPS

Heinz Uelzmann, Cuyahoga Falls, and David C. Hidinger, Jr., Akron, Ohio, assignors to The General Tire & Rubber Company, a corporation of Ohio
No Drawing. Filed Sept. 28, 1967, Ser. No. 671,187
Int. Cl. C08g *30/14, 45/06*
U.S. Cl. 260—47                                                                9 Claims

ABSTRACT OF THE DISCLOSURE

Epoxy resin adhesives with improved adhesive properties, e.g., higher shear strengths under conditions of shorter cure time and/or lower cure temperature, are formed from mixtures of epoxy resins and aziridinyl compounds containing catalytic amounts of compounds that have both >NH and

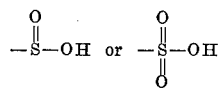

groups, e.g., sulfamic acid or formamidine sulfinic acid.

BACKGROUND OF THE INVENTION

Field of the invention

Materials which are now generally referred to as "epoxy resins" are well known in the art and the manufacture and use of this class of materials are highly developed. The materials which are called "epoxy resins" are monomers or low polymers which contain reactive epoxy groups. Typical examples are the products prepared from epichlorohydrin and polyhydroxy aliphatic or aromatic compounds, such as Bisphenol A, (bis(p-hydroxyphenyl) propane) 1,4-butane diol, etc.

A wide variety of compounds may be used to cure epoxy resins to form solid products which can have varied properties tailored for desired end uses. One of the more important commercial uses of epoxy resins is the production of adhesive compositions and such adhesives are widely used for cementing, joining or laminating together various elements. Aziridinyl compounds have been employed as curing agents for epoxy resins in the formation of adhesives and this present invention concerns improvements in such class of adhesive products to provide improved results when compared with prior known materials of the class.

Description of the prior art

Early in the development of epoxy resins, it was known that compounds containing many different forms of reactive groups could be used as curing agents for epoxy resins to convert the resins into high molecular weight solid products. Imino groups such as present in aziridinyl compounds were known to be useful as such curing agents (U.S. 2,712,535). As the technology in epoxy resins developed, specific uses for the products evolved including adhesive compositions, some of which involved preparation of high molecular weight compounds of adhesive properties from epoxy resins and aziridinyl compounds of the general type referred to as "bis-amides" which are reacted together without use of catalyst (U.S. 2,901,443).

Further modifications in this class of product included the preparation of epoxy resin copolymers from epoxy resins and substituted ethylene amides which might include catalysts useful in epoxy resin systems, e.g., amines, acid anhydrides, etc. (U.S. 3,079,367). Many other types of aziridinyl compounds have been developed that are reactive with epoxy resins and some of these may, in addition to aziridinyl groups, contain epoxy groups (U.S. 3,144,417 and 3,240,720).

Various types of substances have been disclosed to be useful as catalysts in reactions of epoxy compounds, e.g., metal salts and other metal compounds (U.S. 3,144,417) or sulfuric acid, boron trifluoride or other Lewis acid compounds (U.S. 2,712,535) and the like. However, other disclosures relating to use of aziridinyl compounds as curing agents caution against contact of the curing systems with active hydrogen compounds (U.S. 3,258,452).

Notwithstanding the many developments in the field of epoxy resins and, particularly production of adhesive compositions and products utilizing epoxy resins in combination with aziridinyl compounds, a need exists for improvements in this art such as increasing shear strength of laminations made with epoxy resin adhesives, reduction in required curing times to obtain a given shear strength or reduction in the temperatures needed to bring about a satisfactory cure.

OBJECTS

It is a principal object of this invention to provide new improvements in adhesive compositions, laminated products including an adhesive layer comprising such improved adhesive compositions and methods of adhering, cementing or the like utilizing such adhesives.

Further objects include the provision of:

(1) New epoxy resin adhesives which exhibit higher shear strength under conditions of shorter cure time and/or lower cure temperature as compared with prior known epoxy resins using aziridinyl compounds or related materials as curing agents.

(2) New forms of catalysts effective in the curing of epoxy resins with aziridinyl compounds and adhesive compositions comprising such new catalysts (3) Methods of laminating sheets of metal or other webs together with greater effectiveness than heretofore using epoxy resin adhesive cured by aziridinyl compounds and new laminated products resulting from such procedures.

(4) New information and knowledge concerning the formulation of epoxy resin adhesives and catalysts which may be employed to improve adhesive properties in epoxy resin adhesive compositions containing aziridinyl compounds as curing agents.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

These objects are accomplished according to the present invention, at least in part, by using as catalysts for adhesive compositions comprising epoxy resins and aziridinyl compound substances which contain an

group and an acidic sulfur containing group

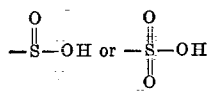

The nitrogen-containing groups which may be present in the catalyst substances include:

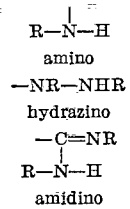

and

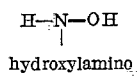

wherein R=hydrocarbon radical or hydrogen.

The sulfur containing acidic group includes:

sulfonic acid (—SO$_2$—OH) and
sulfinic acid (—SO—OH).

Taurine, sulfamic acid and formamidine sulfinic acid are exemplary of compounds to be used as the catalysts.

Adhesive compositions prepared in accordance with the invention are capable of forming cured solid products having high bonding strength and of exhibiting relatively high shear strength for relatively short cure times or low cure temperatures. Broadly the adhesive compositions in accordance with the invention will comprise:

(A) A hardenable epoxide compound having more than one epoxide group per mol,
(B) An aziridinyl cross-linking agent, and
(C) As a catalyst for the reaction of said epoxide compound with said aziridinyl cross-linking agent, an acidic compound containing a

group and a

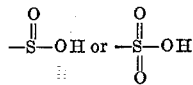

group.

In forming the adhesive compositions of the invention, monoaziridines may be employed, but it is advantageous to use di- or polyaziridinyl compounds since these have been found to give denser cured solid adhesive products having higher strength properties. Alkylene bisaziridine carboxylates, e.g., butylene bis (beta —N— ethylenimino) propionate, are preferred aziridinyl compounds for use in the invention.

The above objects are also, in part, accomplished by the formation of laminated products comprising at least two webs fixed together by a cured adhesive material formed by the reaction of a hardenable epoxide compound having more than one epoxide group per mol and an aziridinyl cross-linking agent in the presence of a catalyst which is an acidic compound containing at least one

group and at least one

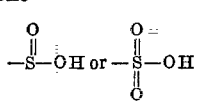

group.

The adhesive compositions of the invention are particularly useful in joining together sheets of metal or forming laminated products in which plates or sheets of metal are jointed to other webs. The adhesive improvements are particularly useful in the cementing together of sheets or plates of ferrous metal such as steel.

EXAMPLES

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

Example 1

Adhesive assemblies of steel coupons were prepared from three separate epoxy-aziridine adhesives having the following compositions.

Adhesive 1A:                                        Parts
    Epoxy resin 828 _____ 100
    EBEP _____ 100
Adhesive 1B:
    Epoxy resin 828 _____ 100
    EBEP _____ 100
    Sulfamic acid _____   3
Adhesive 1C:
    Epoxy resin 828 _____ 100
    EBEP _____ 100
    1-amino-2-naphthol-4-sulfonic acid _____   3

In these formulations, the epoxy resin 828 is a commercially available liquid condensation polymer of epichlorohydrin and Bisphenol A having an epoxide equivalent of 175–210, an average molecular weight of 350–400 and a viscosity at 25° C. between 5,000 to 15,000 centipoises. The designation "EBEP" stands for ethylene bis (β-N-ethylenimino) propionate which may be prepared by transesterification of methyl β-N-ethylenimino propionate with ethylene glycol in the presence of a transesterification catalyst such as sodium methoxide.

Adhesive 1A was a control material containing no catalyst for comparison with Adhesives 1B and 1C containing catalyst in accordance with the invention.

Assemblies of steel coupons were prepared using the foregoing adhesives. Each assembly consisted of two 1″ x 4″ pieces of phosphated steel joined together with a ½″ overlap, giving 0.5 sq. in. of adhesive area. A coating of 0.002 to 0.004″ thickness of the test adhesive was applied to such area of one coupon and this was then overlapped by the second coupon. Each such assembly was then clamped at the overlapped portion in a clamp under 45 lbs. torque. A plurality of such assemblies were prepared for each of the three adhesives and these were then all placed in an oven and cured for 1 hour at 120° C. The cured samples were then cooled, removed from the clamps and subjected to a lap shear test in an Instron tester according to established industry practice. The resulting average lap shear strength data are reported in the following table:

TABLE I

|  | Avg. lap shear (p.s.i.) at 0.05 in./min. |
| Adhesive: | crosshead speed |
| --- | --- |
| 1A | 1334 |
| 1B | 2030 |
| 1C | 1550 |

Example 2

The following adhesive compositions were prepared.

Adhesive 2A:                                        Parts
    Epoxy resin 828 _____ 100
    EBBP _____ 100
Adhesive 2B:
    Epoxy resin 828 _____ 100
    EBBP _____ 100
    Formamidine sulfinic acid _____   3

The first adhesive contained no catalyst and was for comparison purposes. In both formulations, "EBBP" designates ethylene bis (β-N-butylenimino) propionate which may be prepared by transesterification of methyl —β— N-butylenimino propionate with ethylene glycol.

Adhesive assemblies of phosphated steel coupons were prepared and tested as in Example 1, with the variation that several different curing times were used. Average lap shear test results reported in pounds per square inch at 0.05 in./min. crosshead speed are given in the following table:

TABLE II

| Cure Conditions | Adhesive 2A | Adhesive 2B |
|---|---|---|
| 2 hr., 120° C | | 1534 |
| 2.5 hr., 120° C | 1026 | |
| 4 hr., 120° C | 1614 | 2126 |
| 6 hr., 120° C | 1634 | 1886 |

Example 3

A series of pairs of adhesive compositions was prepared. In each pair, the first composition consisted of 100 parts of epoxy resin and 100 parts of aziridinyl compound (without catalyst) and the second composition was the same except for the addition of 3 parts of catalyst. The ingredients of these compositions were—

Adhesive 3A1:
  Epoxy resin 828
  Butylene bis (β-N-ethylenimino) propionate
Adhesive 3A2:
  3A1+formamidine sulfinic acid
Adhesive 3B1:
  Epoxy resin 828
  2,2'-oxydiethyl bis (β-ethylenimino) propionate
Adhesive 3B2:
  3B1+formamidine sulfinic acid
Adhesive 3C1:
  Epoxy resin 828
  2-butenylene 1,4-bis (β-N-ethylenimino) propionate
Adhesive 3C2:
  3C1+formamidine sulfinic acid
Adhesive 3D1:
  Epoxy resin 828
  Thio bis-ethyl (β-N-ethylenimino) propionate
Adhesive 3D2:
  3D1+formamidine sulfinic acid.

Adhesive assemblies of steel coupons were prepared and tested as in Example 1 resulting in the average data reported in the following table.

TABLE III

| Adhesive: | Lap shear (p.s.i.) at 2 in./min. crosshead speed |
|---|---|
| 3A1 | 1325 |
| 3A2 | 2910 |
| 3B1 | 2030 |
| 3B2 | 2860 |
| 3C1 | 1530 |
| 3C2 | 2180 |
| 3D1 | 1900 |
| 3D2 | 2380 |

Example 4

As a basis for comparison, control tests were made on adhesive assemblies of the type described in Example 1 prepared using the following adhesive compositions cured under optimum conditions as given in the "Handbook of Adhesives" by Skeist.

Adhesive 4A:
  Epoxy resin 828—200 parts
  2,4,6-tri(dimethyl amino methyl) phenol—12 parts
  Cured 1 hr.—80° C.
  Avg. lap shear—635 p.s.i. #

Adhesive 4B:
  Epoxy resin 828—200 parts
  Diethylene triamine—20 parts
  Cured 0.5 hr.—115° C.
  Avg. lap shear—190 p.s.i. #
Adhesive 4C:
  Epoxy resin 828—100 parts
  Methylcyclopentadiene-maleic anhydride adduct—82 parts
  Benzyl dimethylamine—2 parts
  Cured 16 hrs.—120° C.
  Plus 1 hr.—180° C.
  Avg. lap shear—1264 p.s.i. #
at 0.05 in./min. crosshead speed.

DISCUSSION OF DETAILS

It is apparent from the foregoing disclosure and examples that a wide variety of compounds may be used as catalysts within the scope of the invention provided that these compounds contain the nitrogen containing group and the acidic sulphur containing group is indicated hereinbefore. Some of the usable materials are more effective than others in terms of unit weight, shelf life of the adhesive composition and other factors. Examples of materials contemplated for use as catalyst in accordance with the invention include:

sulfamic acid,
2-aminoethane sulfonic acid,
formamidine sulfinic acid,
p-amino benzene sulfonic acid,
1-amino-2-naphthol-4-sulfonic acid,
3-indolyl sulfonic acid,
hydrazobenzene-4-sulfonic acid,
3-(2-N-hydroxyamino) butyl phenyl sulfonic acid,
N,N¹-dimethyl amidino phenyl-4-sulfonic acid, and
N,N¹-diethyl formamidine sulfinic acid.

Mixtures of two or more of the usable substances may be employed to catalyze the curing of epoxy resins with the aziridinyl compounds. As an alternative, the new catalysts of the invention may be used in combination with other catalysts known to aid in the curing of epoxy resins so long as such added catalyst would not be incompatible or reactive with the catalyst as contemplated for use specifically in this invention.

A variety of aziridinyl compounds may be used in conjunction with epoxy resins for forming adhesive compositions of this invention. Monoaziridines are contemplated for use, but polyaziridinyl compounds are preferred. Advantageously, one uses a multi-aziridinyl compound of the type represented by the following general formula:

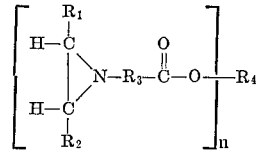

wherein:

$R_1$ and $R_2$ are hydrogen or hydrocarbon radicals,
$R_3$ is a hydrocarbon radical,
$n$ is an integer greater than 1, and
$R_4$ is an organic radical having a valence of $n$.

A preferred class are the multiaziridinyl compounds having the foregoing formula in which:

$R_1$ is hydrogen,
$R_2$ is 1–4 carbon atom alkyl,
$R_3$ is 1–4 carbon atom alkylene,
$n$ is 2, and
$R_4$ is 1–4 carbon atom alkylene.

Examples of aziridinyl compounds contemplated for use as cross-linking agents in forming adhesive compositions in accordance with the invention include:

ethylene bis(β-N-ethylenimino) propionate
ethylene bis(β-N-butylenimino) propionate
butylene bis(β-N-ethylenimino) propionate
2,2'-oxydiethyl bis(β-N-ethylenimino) propionate
2-butenylene-1,4-bis(β-N-ethylenimino) propionate
thio bis ethyl (β-N-ethylenimino) propionate
2,2',2''-nitrilotriethyl tris (β-N-ethylenimino) propionate
glycidyl aziridine
glycidyl aziridino propionate
aziridinyl ethyl vinyl sulfone
N,N'-diethylene p-phenylenediacetamide
N,N'-diethylene phenylenoxydiacetamide
N-allylaziridine
1-benzylethyleneimine
N-octyl-N'-ethyleneurea
N,N'-bis-1,2-ethylene sebacamide
N,N'-bis-1,2-ethyleneisophthalamide
Ethylene bis-[β-(N-aziridino)] butyrate
1,3-bis(aziridino)-2-hydroxybutane.

The term "epoxy resin" as used herein and in the accompanying claims means any organic substance containing a plurality of epoxy groups capable of being copolymerized or otherwise reacted with the other compounds to form high molecular weight solid polymers. A preferred class of the epoxy resins are the reaction products of a polyhydric phenol and a poly-functional halohydrin in which the reaction product contains a plurality of vicinal epoxy groups. However, other monomers or low polymers containing a plurality of epoxy groups reactive with the aziridinyl compounds may be employed. In general, the epoxy resins are complex polymeric reaction products formed by reaction in caustic of products containing one or more hydroxyl groups and another compound containing at least one epoxy group and some other reactive group such as halogen. Typical polyhydric compounds are phenols including resorcinol, various bisphenols and the like. The essential feature of the epoxy resins is the presence therein of a plurality of terminal epoxy groups. The molecular weight of these products can be varied depending to some extent upon relative proportions of reactants used in their preparation and the extent to which the reaction is carried out. Generally, the molecular weight, viscosity and similar variables in the epoxy resins are not critical and the art of use of these compounds has progressed to the point where those familiar with the technology can choose from commercial available products a wide variety of materials tailored to provide particular desired properties in the final product. Some examples of substances encompassed by the term "epoxy resins" as used herein and contemplated for use in accordance with the invention include:

diglycidyl ether of bisphenol A;
diglycidyl ether of pentane diol;
adduct of diglycidyl ether of pentanediol and bisphenol A;
adduct of diglycidyl ether of bisphenol A and a polyalkylene glycol;
(3,4-epoxy-6-methyl cyclohexyl methyl)-3,4-epoxy-6-methyl cyclohexane carboxylate;
1-epoxyethyl-3,4-epoxy cyclohexane diglycidyl ether;
adduct of epichlorohydrin and trihydroxy diphenyl dimethyl methane;
adduct of epichlorohydrin and phloroglucinol;
adduct of epichlorohydrin and erythritol; and
adduct of 3-chloro oxetane and bisphenol A.

The new catalysts of the invention are used in minor amount by weight relative to the epoxy resin and aziridinyl components of the adhesives. Based upon total weight of the adhesive composition, generally satisfactory results can be obtained using between about 0.1 to 10% by weight of the catalyst. Most advantageous results are obtained by forming the adhesive compositions to have a parts by weight ratio of epoxy compound to aziridinyl compound to catalyst of about 1:0.5:0.01 to 1:1.5:0.1.

Compositions of the invention may be prepared using mixing procedures and equipment with which the trade is generally familiar and which are commercially available for the purpose. Ordinarily it is advantageous to mix the catalyst with the aziridinyl compound and to then combine this with the epoxy resin. However, simultaneous mixture of the three essential components can be employed or any other arrangement found by suitable trial to be useful may be employed.

Adhesive compositions of the invention may contain only the three essential ingredients, but it may be advantageous to incorporate other added materials, e.g., fillers, dyes, pigments, plasticizers, extenders, inhibitors, fire-resistant materials and the like. Examples of materials which fall in these categories and which may be usefully included in new adhesive compositions include: zinc oxide, carbon black, iron oxides, chalk, titanium dioxide, silicon dioxide, mica, asbestos, glass fibers, cellulosic fibers, synthetic fibers, alumina, antimony oxide, zinc borate, synthetic rubbers, polyester resins, polyurethane resins and the like. Such added materials may comprise 0.01 to 50% of the total adhesive and advantageously between about 0.1 and 10%.

Adhesive compositions of the invention may be employed for any application for which epoxy type adhesives are known to be useful, e.g., cementing of shoe heels or parts, applying floor and wall coverings, installing gaskets, forming molded articles, applying covers to handles or panels, producing vehicle tires, splicing abrasive or other belts, cementing upholstery materials and the like. A particularly useful application of the adhesives is in the formation of laminated products in which two or more webs are fixed together with an inner layer of cured adhesive formed in accordance with the invention. The new adhesive materials are particularly noteworth in their strength of bonding together sheets of metal. In performing such laminating or cementing operations, any suitable amount of adhesive may be applied to the substrate to be joined, cemented, or the like although because of the high bond strength obtained and improved lap shear properties, relatively thin coats of adhesive may be employed, e.g., coatings of the order of 2 to 10 mils.

The adhesive compositions of the invention are characterized by the ability to attain satisfactory bonding strengths at curing temperatures or curing times lower than those required heretofore in the curing of related epoxy resin adhesives. Exact curing conditions can be varied depending upon the particular combination of epoxy resin and aziridinyl compound used, but advantageously one employs times of the order of one minute to six hours at temperatures of 80 to 180° C., shorter times generally being used, the higher the temperature. Preferred curing conditions involve curing times of 0.1–1 hour at 100 to 150° C.

Normally the adhesive compositions are formulated without use of solvents. Where dilution of the adhesives may be desirable for spreading or coating purposes or for other reasons, solvents or inert extenders may be employed. Examples of useful solvents include hydrocarbons such as heptane, cyclohexane, toluene, benzene, halogenated hydrocarbons, such as carbon tetrachloride, chloroform, trichloroethylene, and the like, or organic esters, ethers and similar organic liquids normally classified as solvents and with which the epoxy compound or aziridinyl compound used in the adhesives do not react under the conditions of use of the adhesives. When and if used, solvents may advantageously comprise 10 to 90% by weight of the total adhesive composition.

The embodiments of the invention in which an exclusive property or right is claimed are defined as follows:

1. A composition useful as an adhesive and capable of forming a cured solid product having high bonding strength which comprises:
(A) a hardenable epoxide compound having more than one epoxide group per mol,
(B) an aziridinyl cross-linking agent, and
(C) as a catalyst for the reaction of said epoxide compound with said aziridinyl cross-linking agent, an acidic compound containing a

group and a

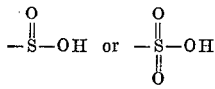

group.

2. A composition as claimed in claim 1 consisting of:
(A) one part of the diglycidyl ether of bis(p-hydroxyphenyl propane),
(B) one part of ethylene bis (beta-N-ethylenimino) propionate, and
(C) 0.03 part of sulfamic acid.

3. A composition as claimed in claim 1 wherein said

group of said acidic compound is selected from the group consisting of amino, hydrazino, amidino and hydroxylamino.

4. A composition as claimed in claim 1 wherein said acidic compound contains a

group and a sulfonic acid group.

5. A composition as claimed in claim 1 wherein said aziridinyl cross-linking agent is a multi-aziridinyl compound of the general formula:

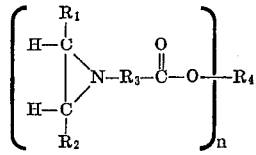

wherein:
$R_1$ and $R_2$ are hydrogen or hydrocarbon radicals,
$R_3$ is a hydrocarbon radical,
$n$ is an integer greater than 1, and
$R_4$ is an organic radical having a valence of $n$.

6. A composition as claimed in claim 5 wherein:
$R_1$ is hydrogen,
$R_2$ is 1–4 carbon atom alkyl,
$R_3$ is 1–4 carbon atom alkylene,
$n$ is 2, and
$R_4$ is 1–4 carbon atom alkylene.

7. A composition as claimed in claim 1 wherein the parts by weight ratio of epoxide compound to cross-linking agent to catalyst is about 1:0.5:0.01 to 1:1.5:0.1.

8. A composition comprising the reaction product of:
(A) a hardenable epoxide compound having more than one epoxide group per mol,
(B) an aziridinyl cross-linking agent, and
(C) an acidic compound containing a

group and a

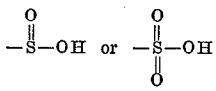

group.

9. A composition as claimed in claim 8 wherein said acidic compound is sulfamic acid.

References Cited

UNITED STATES PATENTS

| | | | |
|---|---|---|---|
| 2,712,535 | 7/1955 | Fisch | 260—835 |
| 2,817,602 | 12/1957 | Pardo | 117—141 |
| 2,831,830 | 4/1958 | Schroeder | 260—47 |
| 2,901,443 | 8/1959 | Starck et al. | 260—2 |
| 3,079,367 | 2/1963 | Fram et al. | 260—47 |
| 3,228,911 | 1/1966 | Rogier | 260—47 |
| 3,240,720 | 3/1966 | Smith | 260—2 |
| 3,277,050 | 10/1966 | Pettigrew | 260—47 |
| 3,303,144 | 2/1967 | Strother | 260—2 |

WILLIAM H. SHORT, Primary Examiner

H. SCHAIN, Assistant Examiner

U.S. Cl. X.R.

156—330; 161—186; 260—2, 9, 17.2, 33.6, 33.8, 37, 830, 835